United States Patent
Aoyama

(10) Patent No.: US 7,542,180 B2
(45) Date of Patent: Jun. 2, 2009

(54) SCANNER APPARATUS, ADJUSTING JIG FOR SCANNER AND MANUFACTURING METHOD FOR SCANNER APPARATUS

(75) Inventor: Noboru Aoyama, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 1061 days.

(21) Appl. No.: 10/876,918

(22) Filed: Jun. 25, 2004

(65) Prior Publication Data

US 2004/0263919 A1    Dec. 30, 2004

(30) Foreign Application Priority Data

Jun. 27, 2003    (JP)    ............... 2003-184870

(51) Int. Cl.
*H04N 1/04*    (2006.01)
*H04N 1/46*    (2006.01)

(52) U.S. Cl. ............... 358/474; 358/482; 358/483; 358/505

(58) Field of Classification Search ............... 358/474, 358/505, 482, 483, 513, 514, 471, 472, 504, 358/475; 348/357; 382/312, 319, 321, 323; 396/268; 250/208.1, 239; 359/210; 355/67
See application file for complete search history.

(56) References Cited

U.S. PATENT DOCUMENTS

| | | | | |
|---|---|---|---|---|
| 5,969,760 A | * | 10/1999 | Ernest et al. | ............... 348/357 |
| 6,381,001 B1 | * | 4/2002 | Katakura et al. | ............... 355/67 |
| 6,621,522 B1 | * | 9/2003 | Chang et al. | ............... 358/474 |
| 6,631,013 B1 | * | 10/2003 | Sakaguchi | ............... 358/475 |
| 6,788,436 B1 | * | 9/2004 | Yoshida et al. | ............... 358/475 |
| 6,961,155 B2 | * | 11/2005 | Sakaguchi | ............... 358/475 |
| 2002/0024709 A1 | * | 2/2002 | Tsai | ............... 359/210 |
| 2002/0071141 A1 | * | 6/2002 | Katakura et al. | ............... 358/474 |
| 2003/0086143 A1 | * | 5/2003 | Tsai | ............... 359/210 |
| 2007/0036536 A1 | * | 2/2007 | Thy | ............... 396/268 |

FOREIGN PATENT DOCUMENTS

| | | | |
|---|---|---|---|
| JP | 62-139466 | * | 6/1987 |
| JP | S62-43965 | | 8/1988 |
| JP | 05-075797 | | 10/1994 |
| JP | 07-226822 | | 3/1997 |
| JP | 08-102818 | | 11/1997 |
| JP | 2001124536 | | 10/2002 |

OTHER PUBLICATIONS

English Abstract of JP-62-139466.*
English translation of JP-62-139466.*

* cited by examiner

*Primary Examiner*—Houshang Safaipour
(74) *Attorney, Agent, or Firm*—H. Daniel Schnurmann

(57) ABSTRACT

The invention provides an adjustment jig provided with a pattern for adjusting the direction of a reading line of a scanner which reads a target image line by line, which comprises a holder section for holding the scanner, a first pattern provided adjacent to a target reading line to be read by the scanner when the reading line direction of the scanner held is correctly adjusted, and a second pattern provided adjacent to the target reading line on the side opposite to the first pattern with the target reading line positioned therebetween, the second pattern being different from the first pattern in the brightness of at least one of hues which can be read by the scanner or in the width thereof in the reading line direction.

10 Claims, 6 Drawing Sheets

SCANNER APPARATUS, ADJUSTING JIG FOR SCANNER AND MANUFACTURING METHOD FOR SCANNER APPARATUS

BACKGROUND OF THE INVENTION

The present invention relates to a scanner apparatus, an adjustment jig for a scanner, and a method for manufacturing the scanner apparatus. More particularly, the invention relates to a scanner apparatus, an adjustment jig for a scanner, and a method for manufacturing the scanner apparatus in which a reading line direction of a scanner that reads a target image line by line is adjusted and/or diagnosed.

Published Unexamined Patent Application 10-93787 discloses a method to detect a positional deviation of a photoelectric conversion element in a scanner apparatus based on the result of reading a reference line provided in the scanner apparatus that reads a target image line by line.

In the above method, the positional deviation is detected and corrected by reading a reference line and its neighborhood after manufacturing the scanner apparatus. In recent years, as the resolution of the scanner apparatus has become higher, deviation in the reading line direction of the scanner apparatus has a greater influence on scanned image quality, so that it is required to enhance accuracy of a scanning section. Therefore, it is desirable that the scanning section is adjusted rapidly and easily before the scanning section is mounted in the manufacturing stage, or when the scanner apparatus is maintained in the field.

BRIEF SUMMARY OF THE INVENTION

It is an object of the present invention to provide a scanner apparatus, an adjustment jig for a scanner, and a method for manufacturing the scanner apparatus in which the above-mentioned problem is solved.

According to a first aspect of the invention, an adjustment jig provided with a pattern for adjusting the direction of a reading line of a scanner which reads a target image line by line is provided, which comprises a holder section for holding the scanner, a first pattern provided adjacent to a target reading line to be read by the scanner when the reading line direction of the scanner held is correctly adjusted, and a second pattern provided adjacent to the target reading line on the side opposite to the first pattern with the target reading line positioned therebetween, the second pattern being different from the first pattern in the brightness of at least one of hues which can be read by the scanner or in the width thereof in the reading line direction, is provided. Also, a scanning apparatus and a method for manufacturing the same using the adjustment jig are provided.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1:
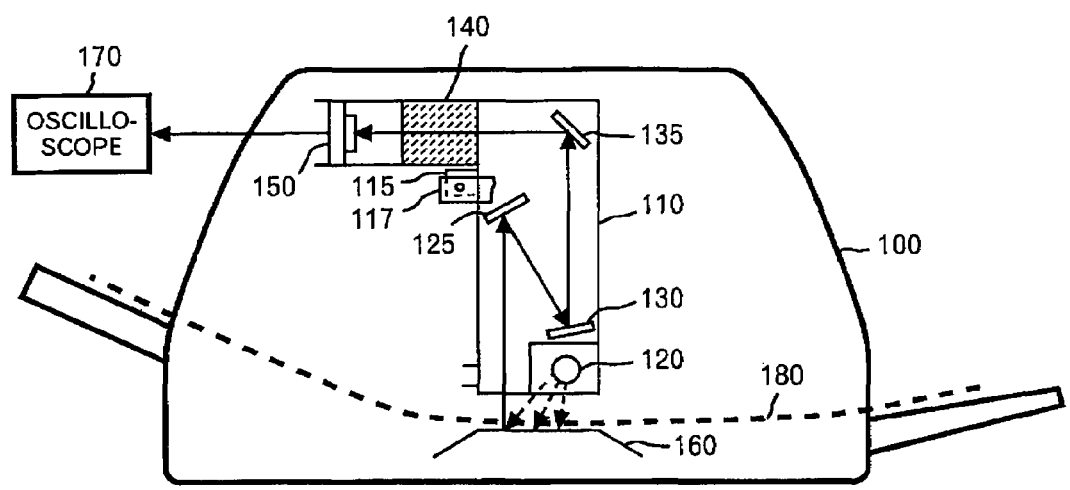
FIG. 1 shows an exemplary configuration of an adjustment jig according to an embodiment of the present invention.

Referring to FIG. 1 there is shown the configuration of an adjustment jig 10 according to an embodiment of the invention. The adjustment jig 10 is provided with patterns for adjusting the direction of a reading line of a scanner 110, and used to adjust the reading line direction of the scanner 110 before mounting it on the scanner apparatus. The adjustment jig 10 includes an adjustment jig housing 100, a scanner 110, a holder section 117, a to-be-scanned section for adjustment 160, and an oscilloscope 170, in which the scanner 110 to be adjusted is fixedly attached.

The adjustment jig housing 100 is a housing of the adjustment jig 10 for accommodating the scanner 110. The scanner 110 reads a target image line by line, and is adjusted using the adjustment jig 10. The scanner 110 includes a held section 115 attached to the holder section 117 to fix the scanner 110 to the adjustment jig housing 100, a fluorescent tube 120 for illuminating the target image to be read, mirrors 125, 130 and 135 for successively reflecting the light reflected from the target image to a lens 140, the lens 140 for condensing light conducted by the mirrors 125, 130 and 135, and a CCD 150 for reading the condensed light line by line and making the photoelectric conversion.

The holder section 117 is attached to the held section 115 to hold the scanner 110. The to-be-scanned section for adjustment 160 is provided with patterns for adjusting the reading line direction of the scanner 110, which will be read by the scanner 110 in adjusting the reading line direction of the scanner 110. The oscilloscope 170 displays a waveform of pixel values of the reading line read by the CCD 150 in the scanner 110.

In the above description, the adjustment jig 10 may have a shape almost equivalent to that of the scanner apparatus on which the scanner 110 is mounted, and may also be used for a test of reading the paper on which the target image is drawn. In the test of reading the paper on which the target image is drawn, the supplied paper may be passed on a paper feed path 180 between the position at which light reflected from the target image is incident upon the scanner 110 and the to-be-scanned section for adjustment 160.

Figure 2:
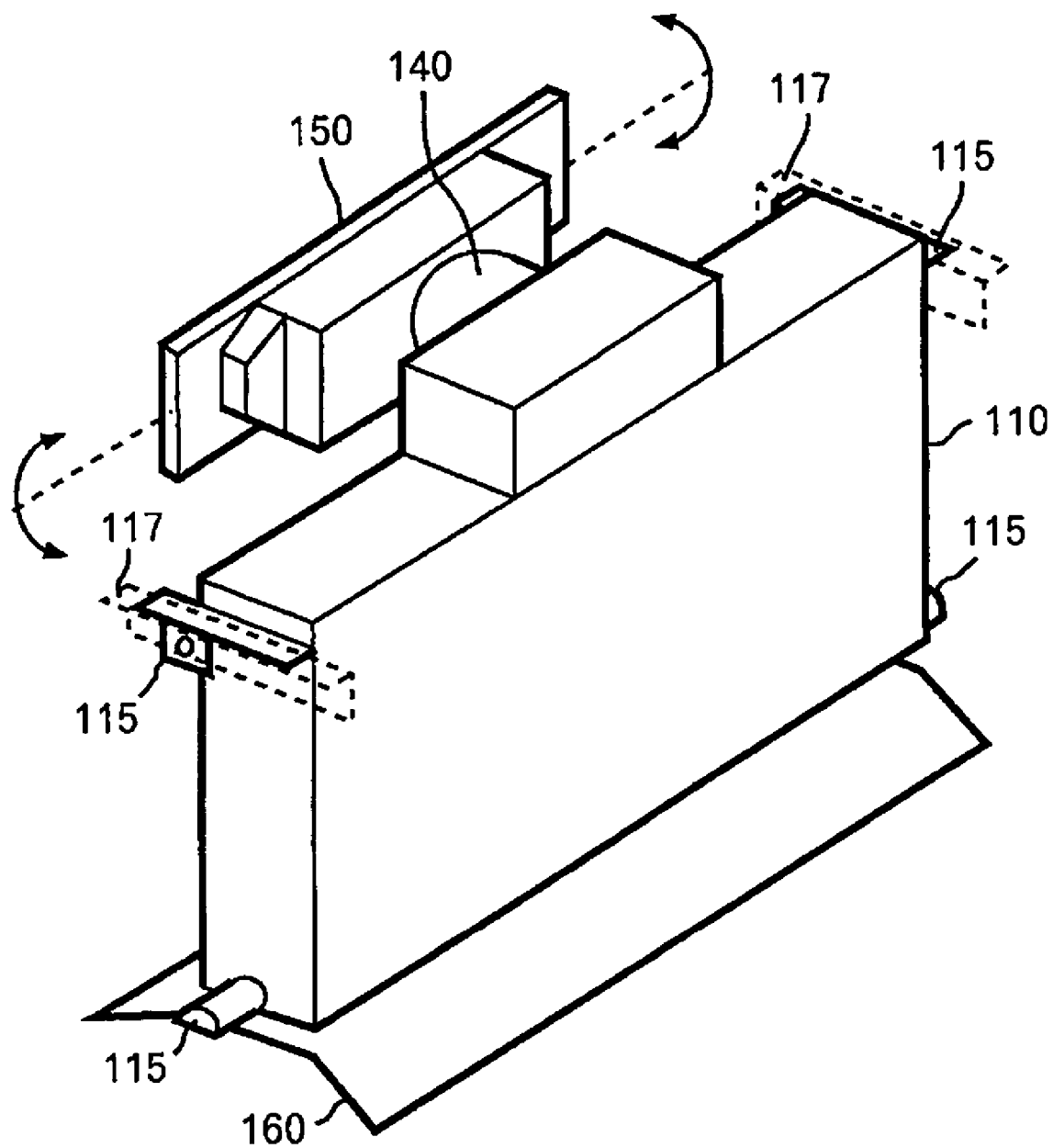
FIG. 2 shows a perspective view of a scanner according to the embodiment of the invention.

FIG. 2 is a perspective view of the scanner 110 according to the embodiment. The scanner 110 is held by the holder section 117 in the adjustment jig housing 100 at the held section 115, or a holder section of the scanner apparatus corresponding to the holder section 117. The scanner 110 is assembled by installing the lens 140 and the CCD 150 in a main body accommodating the fluorescent tube 120, and the mirrors 125, 130 and 135.

In this scanner 110, the reading line direction thereof may be slightly deviated due to installation error and/or individual difference of the mirrors 125, 130 and 135, the lens 140 and the CCD 150. If such a scanner 110 is mounted on a scanner apparatus, a target image is read by the reading line which is not perpendicular to the paper feed direction, causing distortion in the read image. Therefore, the installed position and angle of the CCD 150 relative to the scanner 110 and the lens 140 are adjusted beforehand, based on the result of reading the pattern on the to-be-scanned section for adjustment 160 to enhance the precision of the scanner apparatus to be shipped.

Figure 3:
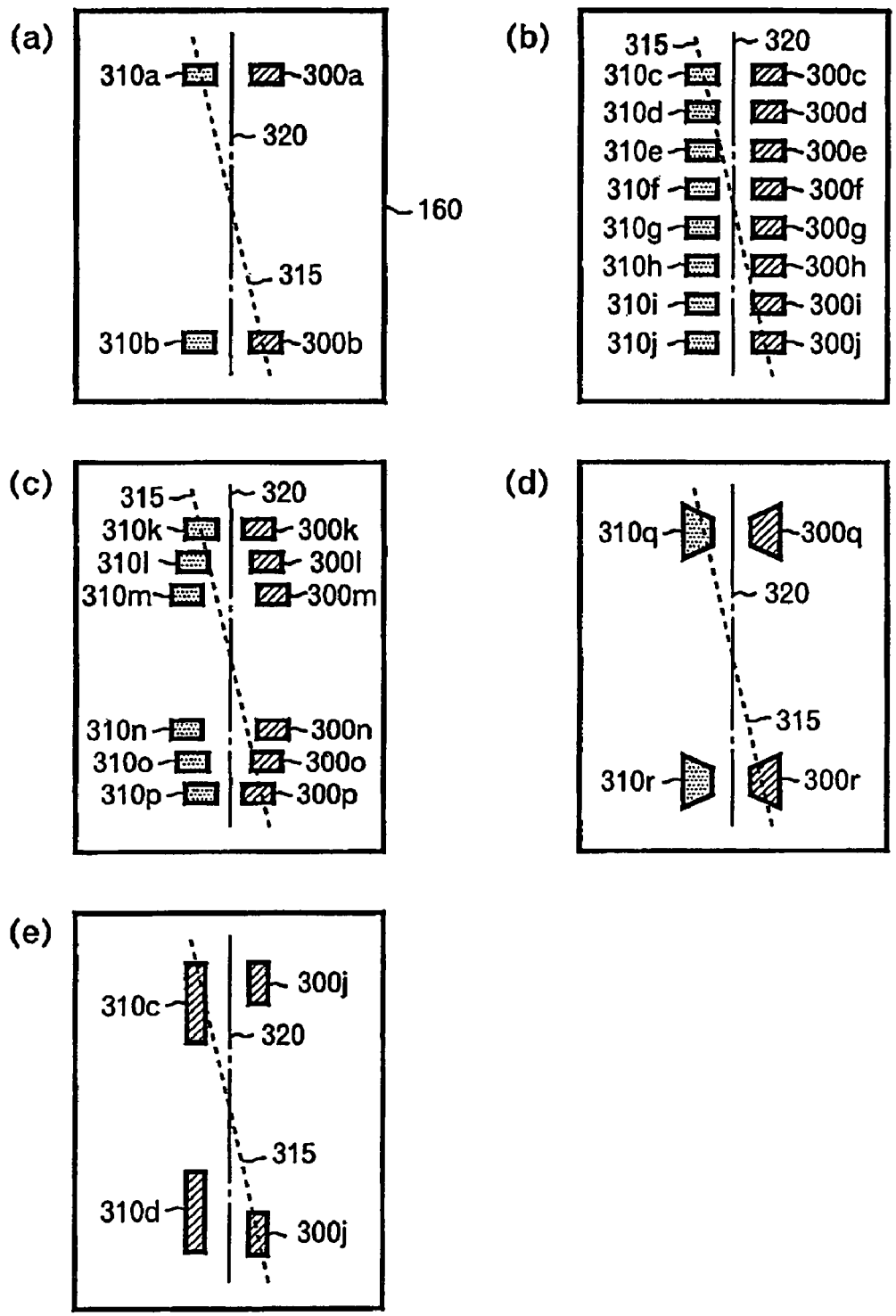
FIG. 3 shows pattern configurations of a to-be-scanned section for adjustment according to the embodiment of the invention in which (a) to (e) show first to fifth pattern configurations of the to-be-scanned section for adjustment, respectively, according to the embodiment of the invention.

FIG. 3 shows pattern configurations of the to-be-scanned section for adjustment 160 according to the embodiment. The to-be-scanned section for adjustment 160 has a first pattern 300 provided adjacent to a target reading line 320 to be read by the scanner 110 when the reading line direction of the scanner 110 held in the adjustment jig 10 is correctly adjusted, and a second pattern 310 provided adjacent to the target reading line 320 on the side opposite to the first pattern 300 with the target reading line 320 positioned therebetween, in which the second pattern 310 is different from the first pattern 300 in the brightness of at least one of the hues which can be read by the scanner 110 or in the width thereof in the reading line direction.

In the above, the first pattern 300 and the second pattern 310 are different in the brightness of at least one of hues which can be read by the scanner 110, which means that when the scanner 110 can read the brightness of each of three hues of RGB (red, green, blue), for example, the first pattern 300 and the second pattern 310 are different in the brightness of at least one of red, green and blue. When the ratio of red, green and blue is different, the first pattern 300 and the second pattern 310 are different in color as a result. Also, when the ratio of red, green and blue is the same, but the brightness thereof is different, the first pattern 300 and the second pattern 310 are the same in color but different in brightness as a result.

In addition, when the scanner 110 can read the brightness of a single color such as white, it means that the brightness of white is varied such as white, gray and black. The brightness as used herein may be a reflection coefficient at which the first pattern 300 and the second pattern 310 reflect the illuminating light from the fluorescent tube 120, or may be the brightness of light in the case where the first pattern 300 and the second pattern 310 are luminous.

Figure 4:
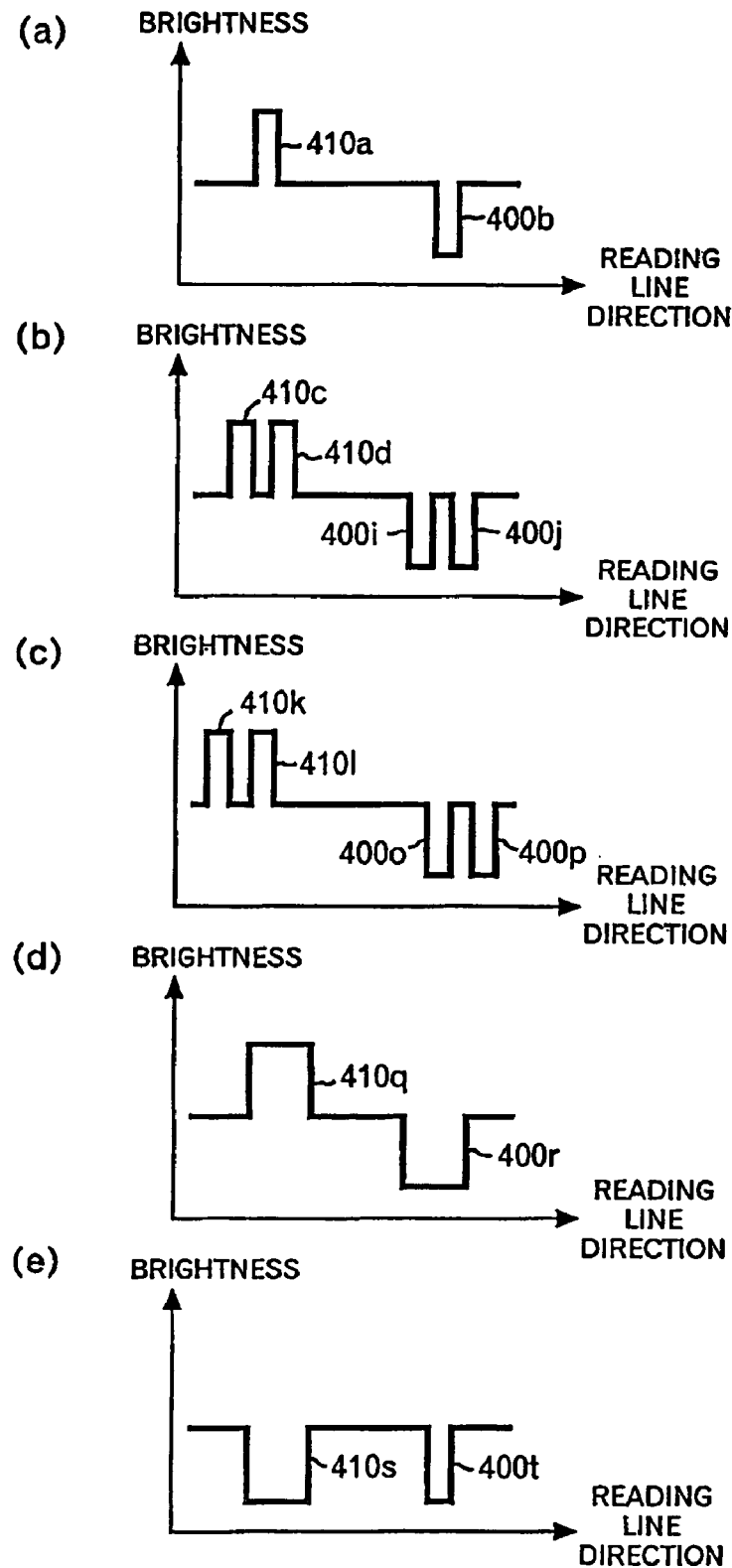
FIG. 4 shows waveforms observed by an oscilloscope according to the embodiment of the invention in which (a) to (e) show examples of waveforms observed in the first to fifth pattern configurations, respectively.

FIG. 3 (*a*) to (*e*) show the pattern configuration examples for the to-be-scanned section for adjustment 160 according to this embodiment. FIG. 4 (*a*) to (*e*) shows the waveform examples observed by the oscilloscope 170 when the patterns of FIG. 3 (*a*) to (*e*) are read, respectively. In the pattern configuration examples of FIG. 3(*a*) to (*e*), the to-be-scanned section for adjustment 160 has a single color such as gray, except for the first pattern 300 and the second pattern 310. Therefore, the area on the adjustment jig 10 where the target reading line 320 is located, that is, the area on the to-be-scanned section for adjustment 160 where the target reading line 320 is located, is also gray.

If the area on the to-be-scanned section for adjustment 160 where the target reading line 320 is located has a single color, such as gray as described above, the value of brightness in this area when read by the scanner 110 can be a middle value of the possible brightness values. Therefore, if the first pattern 300 and the second pattern 310 are given a lower brightness and a higher brightness than this area, it is easily determined which pattern the scanner 110 has read, based on the read value of brightness.

FIG. 3(*a*) shows the first pattern configuration of the to-be-scanned section for adjustment 160 according to this embodiment. In this pattern configuration, the to-be-scanned section for adjustment 160 is provided with a plurality of first patterns 300*a* to 300*b* and a plurality of second patterns 310*a* to 310*b*. The first patterns 300*a* to 300*b* are lower in brightness of at least one of hues that can be read by the scanner 110, for example, black, than the area on the adjustment jig 10 where the target reading line 320 is located. The second patterns 310*a* to 310*b* are higher in brightness of at least one of the hues that can be read by the scanner 110, for example, white, than the area on the adjustment jig 10 where the target reading line 320 is located.

In addition, each of the first patterns 300*a* to 300*b* and the second patterns 310*a* to 310*b* has a rectangular shape in which a side adjacent to the target reading line 320 is parallel to the target reading line 320. Therefore, each pattern appears as a waveform having a certain width on the display of the oscilloscope 170.

Further, one of the first patterns 300*a* to 300*b* and one of the second patterns 310*a* to 310*b* are each provided at a position at which a distance to a first end of the target reading line 320 is smaller than a distance to a middle point of the target reading line 320, and more preferably in the neighborhood of the first end. On the other hand, the other of the first patterns 300*a* to 300*b* and the other of the second patterns 310*a* to 310*b* are each provided at a position at which a distance to a second end of the target reading line 320 different from the first end is smaller than a distance to the middle point of the target reading line 320, and more preferably in the neighborhood of the second end. Therefore, even when the degree of angle deviation of the reading line relative to the target reading line 320 is very small, it is possible to observe such a deviation using the oscilloscope 170.

FIG. 4(*a*) shows one example of the waveform observed by the oscilloscope 170 when the to-be-scanned section for adjustment 160 having the first pattern configuration is read by the scanner 110 which has not been adjusted. For example, when a reading line 315 of the scanner 110 is deviated from the target reading line 320, extending from the second pattern 310*a* to the first pattern 300*b*, the oscilloscope 170 observes a higher brightness at the position of the second pattern 310*a* on the reading line than in the area of the to-be-scanned section for adjustment 160 where the target reading line 320 is located, and observes a lower brightness at the position of the first pattern 300*b* on the reading line than in the area of the to-be-scanned section for adjustment 160 where the target reading line 320 is located. As a result, the oscilloscope 170 displays a second pattern waveform 410*a* for the second pattern 310*a*, indicating higher brightness than in the area of the to-be-scanned section for adjustment 160 where the target reading line 320 is located, and displays a first pattern waveform 400*b* for the first pattern 300*b*, indicating lower brightness than in the area of the to-be-scanned section for adjustment 160 where the target reading line 320 is located.

Observing the display on the oscilloscope 170, the operator who adjusts the scanner 110 using the adjustment jig 10 knows that the reading line 315 is deviated from the target reading line 320 toward the second pattern 310*a* at a position on that reading line 315 which coincides with the second pattern 310*a*, and the reading line 315 is deviated from the target reading line 320 toward the first pattern 300*b* at a position on that reading line 315 which coincides with the first pattern 300*b*. Accordingly, the operator can adjust the reading line, based on the display of the oscilloscope 170, by moving the position on the reading line 315 toward the target reading line 320 from the second pattern 310*a* which has been deviated toward the second pattern 310*a*, and by moving the position on the reading line 315 toward the target reading line from the first pattern 300*b* which has been deviated toward the first pattern 300*b*.

In the same way as above, it is possible to distinguish the waveform displayed on the oscilloscope 170 in the cases where the reading line 315 extends from the first pattern 300a to the second pattern 310b, from the first pattern 300a to the first pattern 300b, and from the second pattern 310a to the second pattern 310b. Thus, the operator knows the direction in which the reading line 315 of the scanner 110 is deviated.

FIG. 3(b) shows the second pattern configuration of the to-be-scanned section for adjustment 160 according to this embodiment. In this pattern configuration, the to-be-scanned section for adjustment 160 is provided with a plurality of first patterns 300c to 300j along the target reading line 320 and a plurality of second patterns 310c to 310j on the side opposite to the plurality of first patterns 300c to 300j with the target reading line 320 positioned therebetween. The first patterns 300c to 300j may have almost the same brightness and shape as the first patterns 300a to 300b, and the second patterns 310c to 310j may have almost the same brightness and shape as the second patterns 310a to 310b. Also, the plurality of first patterns 300c to 300j and the plurality of second patterns 310c to 310j are preferably provided at equal intervals in the direction of the target reading line 320.

FIG. 4(b) shows one example of the waveform observed by the oscilloscope 170, when the to-be-scanned section for adjustment 160 having the second pattern configuration is read by the unadjusted scanner 110. For example, when the reading line 315 of the scanner 110 is deviated from the target reading line 320, extending from the second pattern 310c to the first pattern 300j, the oscilloscope 170 observes a higher brightness at the position of the second pattern 310c on the reading line 315 than in the area of the to-be-scanned section for adjustment 160 where the target reading line 320 is located, and observes a lower brightness at the position of the first pattern 300j on the reading line 315 than in the area of the to-be-scanned section for adjustment 160 where the target reading line 320 is located. As a result, the oscilloscope 170 displays a second pattern waveform 410c for the second pattern 310c, indicating higher brightness than in the area of the to-be-scanned section for adjustment 160 where the target reading line 320 is located, and displays a first pattern waveform 400j for the first pattern 300j, indicating lower brightness than in the area of the to-be-scanned section for adjustment 160 where the target reading line 320 is located.

In addition, when the reading line 315 is deviated obliquely or inclined relative to the target reading line 320, the number of patterns which can be read by the scanner 110, among the first patterns 300c to 300j and/or the second patterns 310c to 310j, varies depending on the deviation angle. In this example, since a second pattern 310d and a first pattern 300i are located on the reading line 315, a second pattern waveform 410d and a first pattern waveform 400i are observed by the oscilloscope 170. On the other hand, since the reading line 315 passes areas between the first pattern 300e and the second pattern 310e, between the first pattern 300f and the second pattern 310f, between the first pattern 300g and the second pattern 310g, and between the first pattern 300h and the second pattern 310h, these patterns are not observed by the oscilloscope 170.

Therefore, according to the second pattern configuration, by providing the plurality of first patterns 300 and the plurality of second patterns 310 along the target reading line 320, a number of first pattern waveforms 400 and/or a number of second pattern waveforms 410 depending on the deviation angle are observed using the oscilloscope 170, so that the operator knows the direction in which the reading line 315 of the scanner 110 is deviated and the amount of its deviation.

FIG. 3(c) shows the third pattern configuration of the to-be-scanned section for adjustment 160 according to this embodiment. In this pattern configuration, a plurality of first patterns 300k to 300m are arranged such that distances from the target reading line 320 are different from each other, and a plurality of second patterns 310k to 310m are arranged such that distances from the target reading line 320 are different from each other. Similarly, a plurality of first patterns 300n to 300p are arranged such that distances from the target reading line 320 are different from each other, and a plurality of second patterns 310n to 310p are arranged such that distances from the target reading line 320 are different from each other. In this case, the first patterns 300k to 300p may have the almost same brightness and shape as the first patterns 300a to 300b, and the second patterns 310k to 310p may have the almost same brightness and shape as the second patterns 310a to 310b.

In this embodiment, the plurality of first patterns 300k to 300p and the plurality of second patterns 310k to 310p are arranged such that a distance between the target reading line 320 and the pattern concerned becomes larger as a distance between that pattern and the end point of the target reading line 320 becomes larger. Alternatively, the plurality of first patterns 300k to 300p and the plurality of second patterns 310k to 310p may be arranged such that the distance between the target reading line 320 and the pattern concerned becomes smaller as the distance between that pattern and the end point of the target reading line 320 becomes larger.

FIG. 4(c) shows one example of the waveform observed by the oscilloscope 170 when the to-be-scanned section for adjustment 160 having the third pattern configuration is read by the unadjusted scanner 110. For example, when the reading line 315 of the scanner 110 is deviated from the target reading line 320, extending from the second pattern 310k to the first pattern 300p, the oscilloscope 170 observes a higher brightness at the position of the second pattern 310k on the reading line 315 than in the area of the to-be-scanned section for adjustment 160 where the target reading line 320 is located, and observes a lower brightness at the position of the first pattern 310p on the reading line 315 than in the area of the to-be-scanned section for adjustment 160 where the target reading line 320 is located. As a result, the oscilloscope 170 displays a second pattern waveform 410k for the second pattern 310k, indicating higher brightness than in the area of the to-be-scanned section for adjustment 160 where the target reading line 320 is located, and displays a first pattern waveform 400p for the first pattern 300p, indicating lower brightness than in the area of the to-be-scanned section for adjustment 160 where the target reading line 320 is located.

Further, when the reading line 315 is deviated obliquely relative to the target reading line 320, the number of patterns which can be read by the scanner 110, among the first patterns 300k to 300p and/or the second patterns 310k to 310p varies depending on the deviation angle. In this example, since a second pattern 310l and a first pattern 300o are located on the reading line 315, a second pattern waveform 410l and a first pattern waveform 400o are observed by the oscilloscope 170. On the other hand, since the reading line 315 passes areas between the first pattern 300m and the second pattern 310m and between the first pattern 300n and the second pattern 310n, these patterns are not observed by the oscilloscope 170.

Therefore, according to the third pattern configuration, by providing the plurality of first patterns 300 and the plurality of second patterns 310 having different distances from the target reading line 320, a number of first pattern waveforms 400 and/or a number of second pattern waveforms 410 depending on the deviation angle are observed using the oscilloscope 170, so that the operator knows the direction in which the reading line 315 of the scanner 110 is deviated and the amount of its deviation.

FIG. 3(d) shows the fourth pattern configuration of the to-be-scanned section for adjustment 160 according to this embodiment. In this pattern configuration, each of a plurality of first patterns 300q to 300r and a plurality of second patterns 310q to 310r has a shape with its width in the target reading line 320 direction becoming larger as it goes away from the target reading line 320. That is, for example, each of the first patterns 300q to 300r and the second patterns 310q to 310r has a trapezoidal shape in which the upper side shorter than the lower side is adjacent to the target reading line 320. Alternatively, each of the first patterns 300q to 300r and the second patterns 310q to 310r may have a triangular shape in which one vertex is positioned nearer to the target reading line 320 than other vertexes, or the side unparallel to the target reading line 320 may be curved.

In addition, each of a plurality of first patterns 300q to 300r and a plurality of second patterns 310q to 310r has a shape with its width in the target reading line 320 direction becoming smaller as it goes away from the target reading line 320. Also, the first patterns 300q to 300r may have almost the same brightness as the first patterns 300a to 300b, and the second patterns 310q to 310r may have almost the same brightness as the second patterns 310a to 310b.

FIG. 4(d) shows one example of the waveform observed by the oscilloscope 170 when the to-be-scanned section for adjustment 160 having the fourth pattern configuration is read by the unadjusted scanner 110. For example, when the reading line 315 of the scanner 110 is deviated from the target reading line 320, extending from the second pattern 310q to the first pattern 300r, the oscilloscope 170 observes a higher brightness at the position of the second pattern 310q on the reading line 315 than in the area of the to-be-scanned section for adjustment 160 where the target reading line 320 is located, and observes a lower brightness at the position of the first pattern 310r on the reading line 315 than in the area of the to-be-scanned section for adjustment 160 where the target reading line 320 is located. As a result, the oscilloscope 170 displays a second pattern waveform 410q for the second pattern 310q, indicating higher brightness than in the area of the to-be-scanned section for adjustment 160 where the target reading line 320 is located, and displays a first pattern waveform 400r for the first pattern 300r, indicating lower brightness than in the area of the to-be-scanned section for adjustment 160 where the target reading line 320 is located.

In this case, it is noted that as the reading line 315 is more deviated from the target reading line 320, the length of the second pattern 310q on the reading line 315 and the length of the first pattern 300r on the reading line 315 becomes longer. Consequently, as the reading line 315 is more deviated from the target reading line 320, the width of the second pattern waveform 410q and the width of the first pattern waveform 400r in FIG. 4D becomes larger. Accordingly, with the fourth pattern configuration, the operator knows the direction in which the reading line of the scanner 110 is deviated and the amount of its deviation, based on the brightness and width of the first pattern waveform 400 and the brightness and width of the second pattern waveform 410 displayed on the oscilloscope 170.

FIG. 3(e) shows the fifth pattern configuration of the to-be-scanned section for adjustment 160 according to this embodiment. In this pattern configuration, the to-be-scanned section for adjustment 160 is provided with a plurality of first patterns 300s to 300t and a plurality of second patterns 310s to 310t adjacent to the target reading line 320, in which the width of each of the second patterns 310s to 310t in the direction of the reading line is different from the first patterns 300s to 300t. In this pattern configuration, the first patterns 300s to 300t and the second patterns 310s to 310t may be the same in brightness, for example, black.

FIG. 4(e) shows one example of the waveform observed by the oscilloscope 170 when the to-be-scanned section for adjustment 160 having the fifth pattern configuration is read by the unadjusted scanner 110. For example, when the reading line 315 of the scanner 110 is deviated from the target reading line 320, extending from the second pattern 310s to the first pattern 300t, the oscilloscope 170 observes a higher brightness at the position of the second pattern 310s on the reading line 315 than in the area of the to-be-scanned section for adjustment 160 where the target reading line 320 is located, and observes a lower brightness at the position of the first pattern 300t on the reading line 315 than in the area of the to-be-scanned section for adjustment 160 where the target reading line 320 is located. As a result, the oscilloscope 170 displays a second pattern waveform 410s for the second pattern 310s, indicating higher brightness than in the area of the to-be-scanned section for adjustment 160 where the target reading line 320 is located, and displays a first pattern waveform 400t for the first pattern 300t, indicating lower brightness than in the area of the to-be-scanned section for adjustment 160 where the target reading line 320 is located.

In this case, the second pattern 310s has a larger width in the reading line 315 direction than the first pattern 300s, and the second pattern 310t has a larger width in the reading line 315 direction than the first pattern 300t. Accordingly, when observing the display on the oscilloscope 170, the operator knows whether the reading line 315 is deviated to the first pattern 300 or to the second pattern 310 at the observed position, based on the width of each of the first pattern waveform 400 and second pattern waveform 410 that are observed.

Figure 5:
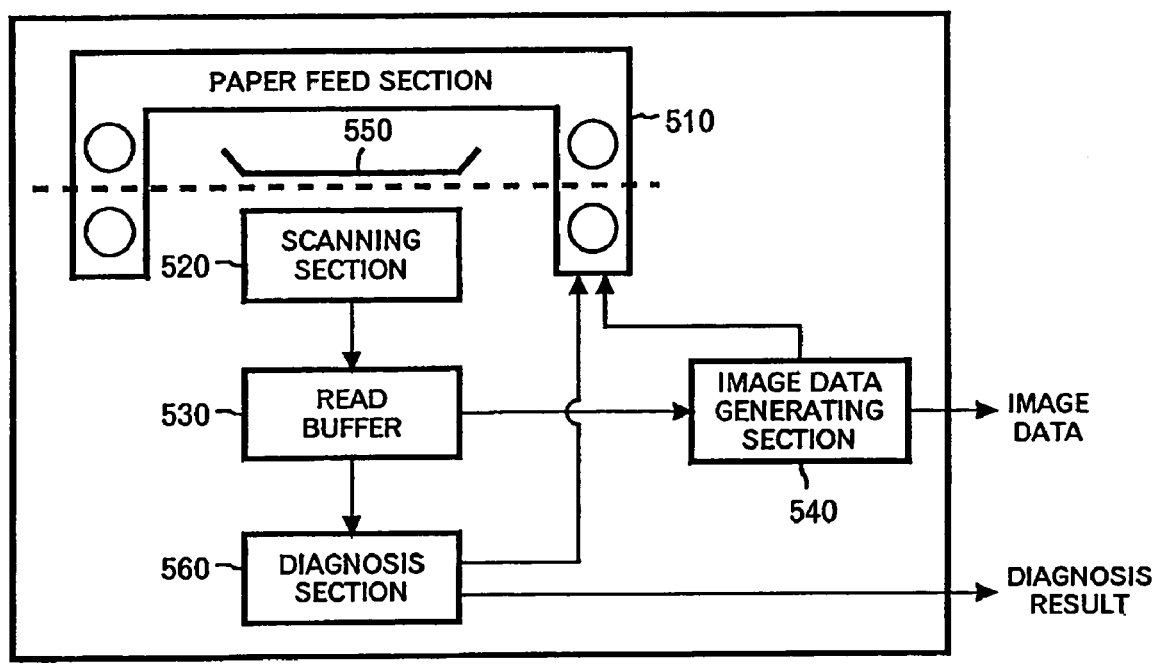
FIG. 5 shows an exemplary configuration of a scanner apparatus according to a modified embodiment of the invention.

FIG. 5 shows the configuration of a scanner apparatus 500 according to another embodiment of the present invention. The scanner apparatus 500 includes a paper feed section 510, a scanning section 520, a read buffer 530, an image data generating section 540, a to-be-scanned section for adjustment 550, and a diagnosis section 560. The paper feed section 510 supplies a target image drawn on the paper to be read by the scanner apparatus 500 to the reading line of the scanning section 520, and moves it on the reading line of the scanning section 520 line by line. The scanning section 520 has the same configuration as the scanner 110, and sequentially reads the target image moved by the paper feed section 510 line by line. The read buffer 530 stores data of one line of the target image read by the scanning section 520. The image data generating section 540 makes an instruction to the paper feed section 510 to move the paper on which the target image is drawn and read by the scanning section 520, and generates the image data of the target image, based on target image data of each line read by the scanning section 520 from the target image on the paper moved sequentially in accordance with the instruction and stored sequentially in the read buffer 530. And the image data generating section 540 outputs the generated image data to an external device.

The to-be-scanned section for adjustment 550 is provided with patterns for diagnosing the reading line direction of the scanning section 520, which are read by the scanning section 520 when the reading line direction of the scanning section 520 is diagnosed. The to-be-scanned section for adjustment 550 in diagnosing the scanner apparatus 500 has a first pattern provided adjacent to the target reading line to be read by the scanning section 520 when the reading line direction is correctly adjusted, and a second pattern provided adjacent to the target reading line on the side opposite to the first pattern with the target reading line positioned therebetween, in which the second pattern is different from the first pattern in brightness of at least one of the hues which can be read by the scanning section 520 or in the width thereof in the reading line direction. Here, the first pattern and the second pattern provided on the to-be-scanned section for adjustment 550 are the same as the first pattern and the second pattern in the to-be-scanned section for adjustment 160 as illustrated in FIG. 3.

When the scanner apparatus 500 is diagnosed, the diagnosis section 560 causes the scanning section 520 to read the target reading line on the to-be-scanned section for adjustment 550, and diagnoses the reading line direction of the scanning section 520, based on the read result. Specifically, if the diagnosis section 560 determines that the first pattern is read, it diagnoses that the reading line is deviated from the target reading line toward the first pattern at a position on that reading line which coincides with the first pattern. On the other hand, if the diagnosis section 560 determines that the second pattern is read, it diagnoses that the reading line is deviated from the target reading line toward the second pattern at a position on that reading line which coincides with the second pattern. Here, the diagnosis section 560 may determine which of the first pattern and the second pattern is read by the method described in connection with FIG. 4, based on the brightness of each pixel of one line of the to-be-scanned section for adjustment 550 read by the scanning section 520 and stored in the read buffer 530.

In the above, the diagnosis section 560 may diagnose the reading line direction of the scanning section 520 when an initialization process is performed at the time of power-on of the scanner apparatus 500, or when the user of the scanner apparatus 500 instructs to start the diagnosis process. If the diagnosis section 560 diagnoses that the reading line direction of the scanning section 520 is deviated, it displays to the user that the reading line direction is deviated, as well as the deviation direction and/or deviation amount of the reading line.

According to the above-described scanner apparatus 500, the diagnosis process by the diagnosis section 560 can detect the deviation direction and/or deviation amount of the reading line of the scanning section 520. Therefore, the user of the scanner apparatus 500 can easily designate the cause of distortion in the image data read by the scanner apparatus 500, and a maintenance engineer can easily maintain the scanner apparatus 500.

Figure 6:
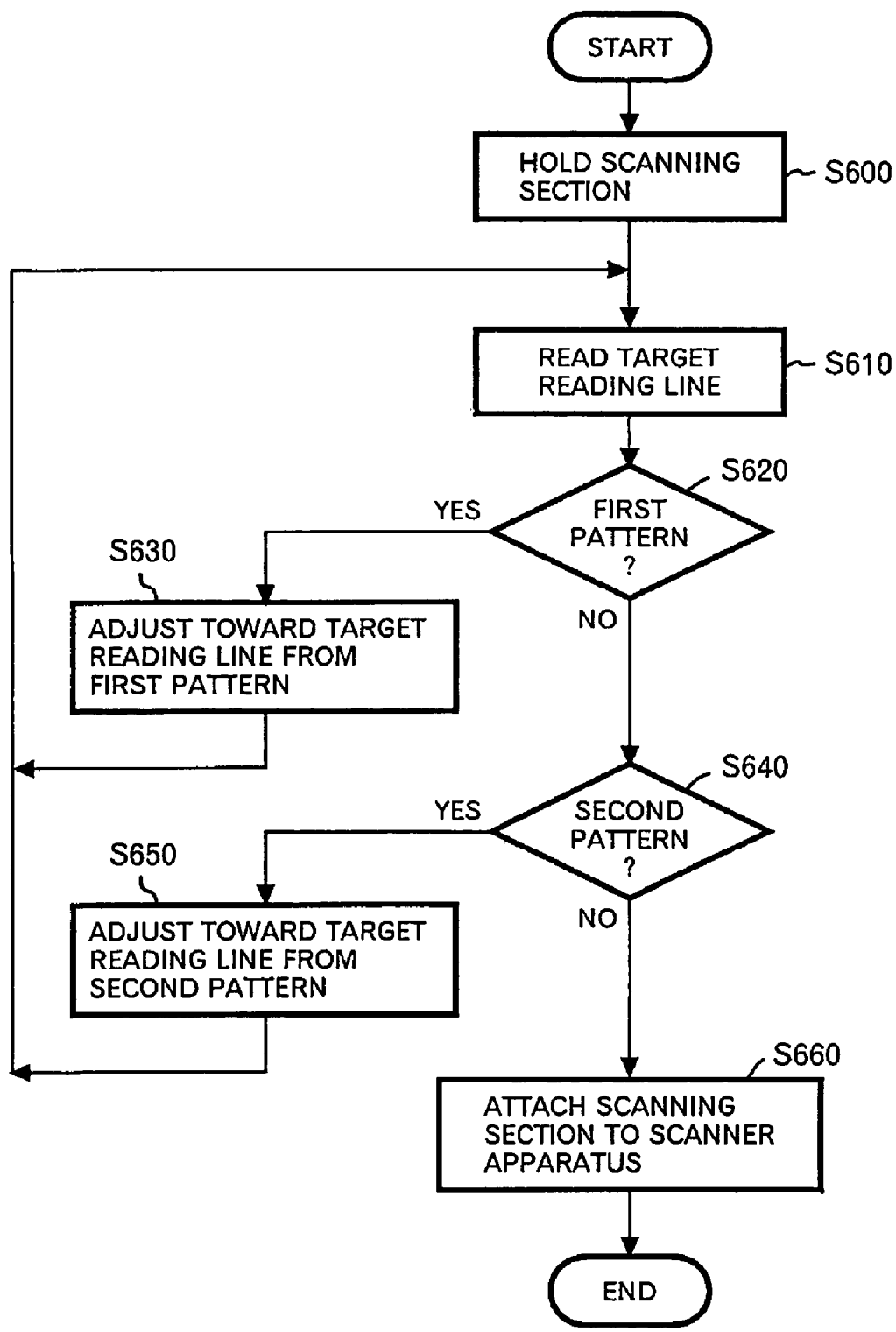
FIG. 6 shows one example of a manufacturing method for the scanner apparatus according to the modified embodiment of the invention.

FIG. 6 shows one example of a manufacturing method for the scanner apparatus 500 according to another embodiment of the invention.

First, in a preparatory step, the paper feed section 510, the scanning section 520, the read buffer 530, the image data generating section 540, the to-be-scanned section for adjustment 550, the diagnosis section 560, and the housing of the scanner apparatus 500 are prepared. Then, in a holding step S600, the scanning section 520 is held on the adjustment jig 10, like the scanner 110. Then, in a reading step S610, the scanning section 520 reads the target reading line on the to-be-scanned section for adjustment 160 provided with a first pattern adjacent to the target reading line to be read by the scanner when the reading line direction of the scanning section 520 held is correctly adjusted, and a second pattern adjacent to the target reading line on the side opposite to the first pattern with the target reading line positioned therebetween, in which the second pattern is different from the first pattern in the brightness of at least one of the hues which can be read by the scanning section 520 or in the width thereof in the reading line direction.

Then, in a diagnosis step, if it is determined that the first pattern is read in the reading step S610, it is diagnosed that the reading line is deviated from the target reading line toward the first pattern at a point on that reading line which coincides with the first pattern (S620). On the other hand, if it is not diagnosed that the reading line is deviated from the target reading line toward the first pattern (S620: No) and it is determined that the second pattern is read in the reading step, it is diagnosed that the reading line is deviated from the target reading line toward the second pattern at a point on that reading line which coincides with the second pattern (S640).

Then, in an adjusting step, based on the result of the diagnosis in the diagnosing step, the scanning section 520 is adjusted by moving the position on the reading line of the scanning section 520 toward the target reading line from the first pattern which has been deviated toward the first pattern (S630). On the other hand, the scanning section 520 is adjusted by moving the position on the reading line of the scanning section 520 toward the target reading line from the second pattern which has been deviated toward the second pattern (S650).

In this manufacturing method, the processing from step S610 to step S650 is repeated until an error between the reading line direction of the scanning section 520 and the target reading line direction becomes smaller than a predetermined value. For example, the above processing is repeated until the first pattern and the second pattern are not read in the reading step S610, and the reading line is located in the area on the to-be-scanned section for adjustment 160 between the first pattern and the second pattern.

Finally, in an attaching step, the adjusted scanning section 520, the paper feed section 510, the reading buffer 530, the image data generating section 540, the to-be-scanned section for adjustment 550 and the diagnosis section 560 are attached to the housing of the scanner apparatus 500.

According to the manufacturing method described above, it is possible to know the deviation direction and/or deviation amount of the reading line of the scanning section 520 depending on which of the first pattern and the second pattern on the to-be-scanned section for adjustment 160 is read, so that the scanner apparatus 500 can be manufactured in a shorter time.

While the invention has been described with reference to the embodiment, the scope of the invention is not limited to the described embodiment, and various changes or improvements may be made to the above embodiment. For example, the scanner apparatus may take the form of reading the target image line by line while moving the scanning section. In this case, the to-be-scanned section for adjustment 550 may be provided at a boundary portion of a range in which the scanning section can be moved. It will be apparent that such changes or improvements may fall within the scope of the invention, as defined in the attached claims.

What is claimed is:

1. An adjustment jig provided with a pattern for adjusting the direction of a reading line of a scanner which reads a target image line by line, said adjustment jig comprising:
   a holder section for holding said scanner;
   a first pattern provided adjacent to a target reading line to be read by said scanner when the reading line direction of said scanner held is correctly adjusted; and
   a second pattern provided adjacent to said target reading line on the side opposite to said first pattern with said target reading line positioned therebetween, said second pattern being different from said first pattern in the brightness of at least one of the hues which can be read by said scanner or in the width thereof in the reading line direction, wherein said first pattern has a lower brightness, and said second pattern has a higher brightness, than an area on said adjustment jig where said target reading line is located.

2. The adjustment jig according to claim 1, wherein said first pattern has a lower brightness of at least one of the hues which can be read by said scanner than an area on said adjustment jig at which said target reading line is located, and said second pattern has a higher brightness of at least one of the hues which can be read by said scanner than an area on said adjustment jig at which said target reading line is located.

3. The adjustment jig according to claim 1, wherein each of said first pattern and said second pattern has a rectangular shape in which a side adjacent to said target reading line is parallel to said target reading line.

4. The adjustment jig according to claim 3, wherein each of said first pattern and said second pattern has a shape with its width in said target reading line direction becoming larger or smaller as it goes away from said target reading line.

5. The adjustment jig according to claim 1, further comprising a plurality of first patterns provided along said target reading line, and a plurality of second patterns provided on the side opposite to said plurality of first pattern with said target reading line positioned therebetween.

6. The adjustment jig according to claim 5, wherein said plurality of first patterns are arranged such that their distances from said target reading line are different from each other, and said plurality of second patterns are arranged such that their distances from said target reading line are different from each other.

7. The adjustment jig according to claim 1, wherein each of said first pattern and said second pattern is provided at a position at which a distance to a first end of said target reading line is smaller than a distance to a middle point of said target reading line.

8. The adjustment jig according to claim 1, having two first patterns and two second patterns, wherein one of said first patterns and one of said second patterns are each provided at a position at which a distance to a first end of said target reading line is smaller than a distance to a middle point of said target reading line, and the other first pattern and the other second pattern are each provided at a position at which a distance to a second end of said target reading line different from said first end is smaller than a distance to said middle point of said target reading line.

9. A scanner apparatus which reads a target image line by line, said scanner apparatus comprising:

a scanning section for reading the target image line by line;

a to-be-scanned section for adjustment:

a first pattern provided adjacent to a target reading line to be read by said scanning section with the reading line direction correctly adjusted when said scanner apparatus is diagnosed, said target reading line being on said to-be-scanned section for adjustment;

a second pattern provided adjacent to said target reading line on the side opposite to said first pattern with said target reading line positioned therebetween, said second pattern being different from said first pattern in the brightness of at least one of hues which can be read by said scanning section or in the width thereof in the reading line direction; and a diagnosis section for causing said scanning section to read said target reading line when said scanner apparatus is diagnosed, and diagnosing that, when it is determined that said first pattern is read, a reading line is deviated from said target reading line toward said first pattern at a position on that reading line which coincides with said first pattern, and that, when it is determined that said second pattern is read, a reading line is deviated from said target reading line toward said second pattern at a position on that reading line which coincides with said second pattern.

10. A method of manufacturing a scanner apparatus which is provided with a scanning section for reading a target image line by line, said method comprising:

a holding step of holding said scanning section with an adjustment jig;

a reading step of causing said scanning section to read a target reading line on a to-be-scanned section for adjustment provided with a first pattern adjacent to said target reading line to be read by said scanning section when the reading line direction of said scanning section held is correctly adjusted, and a second pattern adjacent to said target reading line on the side opposite to said first pattern with said target reading line positioned therebetween, said second pattern being different from said first pattern in the brightness of at least one of hues which can be read by said scanning section or in the width thereof in the reading line direction;

a diagnosing step of diagnosing that, when it is determined that said first pattern is read in said reading step, a reading line is deviated from said target reading line toward said first pattern at a point on that reading line which coincides with said first pattern, and that, when it is determined that said second pattern is read, a reading line is deviated from said target reading line toward said second pattern at a point on that reading line which coincides with said second pattern; and an adjusting step of, based on the result of the diagnosis in said diagnosing step, adjusting said scanning section by moving the position on the reading line of said scanning section toward said target reading line from said first pattern which has been deviated toward said first pattern, and adjusting said scanning section by moving the position on the reading line of said scanning section toward said target reading line from said second pattern which has been deviated toward said second pattern.

* * * * *